UNITED STATES PATENT OFFICE.

CHARLES DE LA HARPE, OF BASLE, SWITZERLAND, ASSIGNOR TO DYE WORKS, FORMERLY L. DURAND HUGUENIN & CO., OF SAME PLACE.

GALLOCYANIN-SULFONIC ACID AND PROCESS OF MAKING SAME.

SPECIFICATION forming part of Letters Patent No. 663,220, dated December 4, 1900.

Application filed July 19, 1900. Serial No. 24,123. (Specimens.)

*To all whom it may concern:*

Be it known that I, CHARLES DE LA HARPE, chemist, a citizen of the Swiss Republic, and a resident of Basle, Switzerland, have invented certain Improvements in the Manufacture of Gallocyanin Dyes, of which the following is a clear and complete specification.

I have found that the leucogallocyaninsulfonic acids described in my application of Letters Patent, Serial No. 24,122, filed July 19, 1900, are very rapidly oxidized in alkaline solutions by air and that by adding to these oxidized solutions an acid and common salt the corresponding gallocyaninsulfonic acids are precipitated. This conversion of the leucogalloxyaninsulfonic acids into gallocyaninsulfonic acids may be effected also by oxidants other than air.

The new gallocyaninsulfonic acids are valuable coloring-matters, which yield by dyeing or printing tints similar to those obtained from the corresponding leucogallocyaninsulfonic acids, but more intense and brilliant. Like the latter they have no affinity for unmordanted cotton, but on wool or chromium mordanted cotton they give tints fast to soap.

The following example illustrates the invention, which is not, however, limited thereto.

Example: Fifteen kilos of the leucogallocyaninsulfonic acid derived from the leuco derivative of ordinary gallocyanin, (product of reaction of nitrosodimethylanilin hydrochlorid on gallic acid,) of prune, (product of reaction of nitrosodimethylanilin hydrochlorid on methylgallate,) of coréin 2 R, (product of reaction of gallamic acid on nitrosodiethylanilin-hydrochlorid or diethylamidoazobenzene hydrochlorid,) or of gallaminblue, (product of reaction of nitrosodimethylanilin-hydrochlorid on gallamic acid,) obtained according to the process described in my application of Letters Patent, to which above is referred, are suspended in five hundred liters of water in a fairly large vessel and dissolved by adding twenty kilos of caustic-soda solution of twenty-five per cent. strength. The solution is agitated in the air until the intensity of the color no longer increases. The coloring-matter is then precipitated by common salt, the excess of soda being eventually neutralized by a little hydrochloric acid and is filtered and pressed. The gallocyaninsulfonic acid is thus obtained in the form of its sodium salt. All these gallocyaninsulfonic acids are in dry state brownish-black powders soluble in water with a violetish-blue color. Their solutions in alkalies are red-brown to violet-blue and become grayish-blue to black-blue on addition of acetic acid. In addition of hydrochloric acid to their solutions in alkalies the color of the solution becomes violet and a precipitate is formed. Their solutions in concentrated sulfuric acid are blue.

What I claim is—

1. The herein-described process for the manufacture of gallocyaninsulfonic acids by oxidizing leucogallocyaninsulfonic acids with a suitable oxidant, in alkaline solution.

2. As a new article of manufacture, a gallocyaninsulfonic acid, dyeing wool and chromium mordanted cotton in intense and brilliant blue tints fast to soap and being in dry state a brownish-black powder soluble in water with a violetish-blue color, soluble in concentrated sulfuric acid with blue color, and soluble in alkalies with a red-brown to violet-blue color becoming grayish-blue to black-blue on addition of acetic acid and violet on addition of hydrochloric acid, the said addition of hydrochloric acid to an alkaline solution of the gallocyaninsulfonic acid giving also a precipitate.

In witness whereof I have hereunto signed my name, this 6th day of July, 1900, in the presence of two subscribing witnesses.

CHARLES DE LA HARPE.

Witnesses:
GEORGE GIFFORD,
AMAND RITTER.